C. S. BARON.
SANITARY PITCHER OR THE LIKE.
APPLICATION FILED MAY 2, 1914.
1,173,546.
Patented Feb. 29, 1916.
2 SHEETS—SHEET 1.
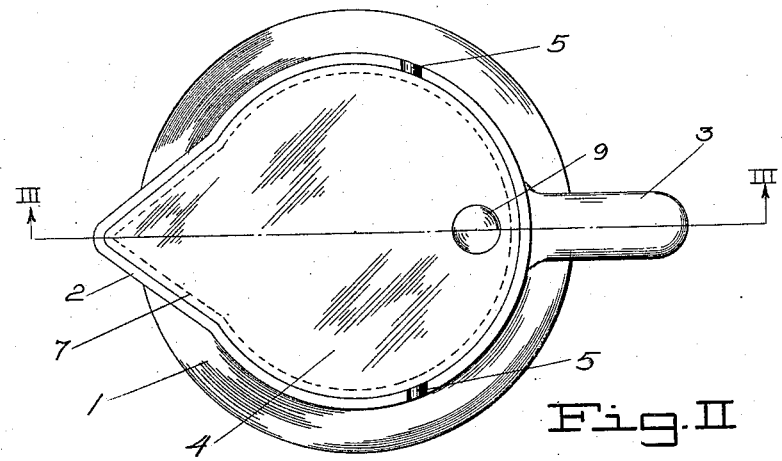
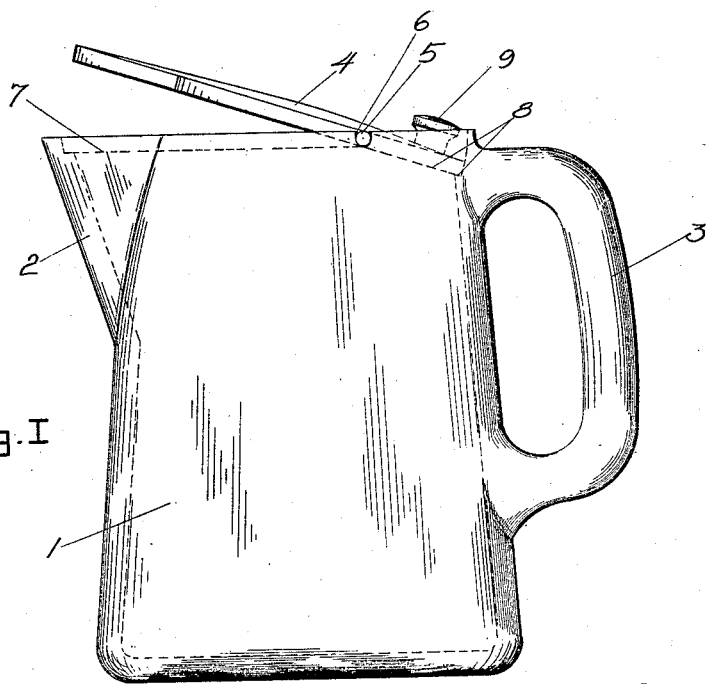

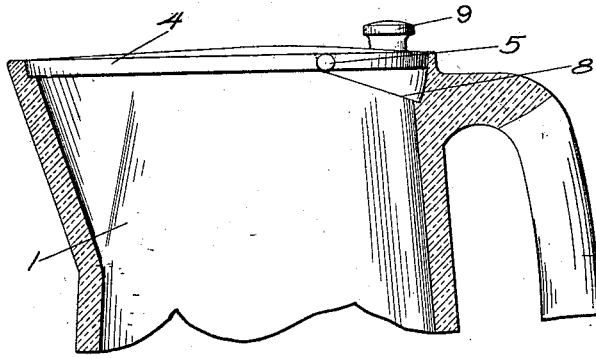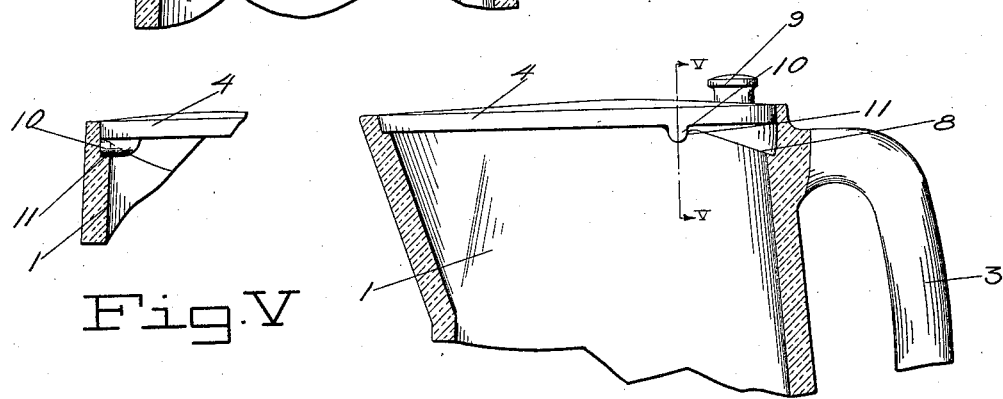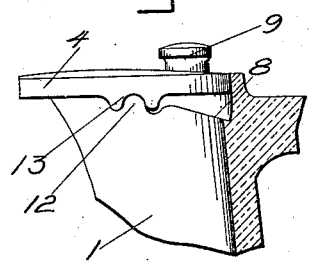

UNITED STATES PATENT OFFICE.

CHARLES S. BARON, OF TIFFIN, OHIO.

SANITARY PITCHER OR THE LIKE.

1,173,546.         Specification of Letters Patent.         Patented Feb. 29, 1916.

Application filed May 2, 1914. Serial No. 835,885.

*To all whom it may concern:*

Be it known that I, CHARLES S. BARON, a citizen of the United States of America, residing at Tiffin, in the county of Seneca, in the State of Ohio, have invented certain new and useful Sanitary Pitchers or the like, of which the following is a specification, reference being had to the accompanying drawings.

My invention relates to pitchers, jugs or containers for liquids, including milk pitchers, water pitchers, syrup jugs, or any similar receptacle that is adapted to hold a liquid with facility of discharge of its contents at intervals as required.

Heretofore receptacles of the class referred to have been more or less unsanitary, by reason of having no top, of having a top which failed to exclude the intrusion of unsanitary matter, or of having a top which in itself or in its operating mechanism was unsanitary.

By my invention, I provide means for perfectly protecting the contents of a receptacle by a top which is sanitary in itself and in respect to the means for operating it, which may be operated with perfect facility, and which is readily removable as often as required for the purpose of washing the receptacle or its top.

What constitutes my invention will be hereafter specified in detail and succinctly set forth in the appended claims.

Referring to the accompanying drawings, which constitute a part of this specification, Figure I is a side elevation of that which, for the purposes of this specification, may be regarded as a preferred form of embodiment of my invention, the same comprehending a milk or water pitcher, the lid thereof being shown as open. Fig. II is a top plan view of the subject matter of Fig. I, showing the lid closed. Fig. III is a section on the line III—III of so much of the subject matter of Fig. I as relates to my invention, the lid of the pitcher being shown in the closed position. Fig. IV is a view similar to Fig. III, showing a modification of my invention in respect to the pivotal connection between the lid and the receptacle. Fig. V is a view on the line V—V of Fig. IV. Fig. VI is a view similar to Fig. III, showing a further modification.

Referring to the numerals on the drawings, 1 indicates the body of a receptacle adapted to contain a liquid, and which may be of any preferred form and dimensions. It is preferably made of glass or fictile material, but may be made of metal or any other material, and is shown as provided upon one side with a spout 2, and upon the opposite side with a handle 3.

My invention comprehends the provision within the open end of the receptacle 1 of a movable and preferably removable lid, cap or cover 4, which is of a contour adapted to fit and snugly close, when in place, the open end of said receptacle. The lid is preferably made of the same material as the receptacle itself, which for sanitary reasons may be made to advantage, as specified, of glass; but it is obvious that the lid may be made of one material and the receptacle of another, as convenience or preference may dictate.

The lid 4 is, by my invention, adapted to be removably pivoted to the receptacle 1 by any suitable pivotal connection, preferably located substantially within the periphery of the open end of the receptacle, which will admit of its opening away from the pitcher on one side by its depression upon the opposite side of its pivotal connection, as illustrated in Fig. 1. To this end the lid may be provided with trunnions 5 projecting from opposite sides of the lid, as shown in Fig. II, and preferably made integrally therewith. These trunnions fit into depressions 6 provided for them respectively, in the opposite sides of the receptacle. The common axis of the trunnions 5 may be assigned any operative location upon the lid 4, it being the object of such location to secure the closing operation of the lid by the action of gravity upon it. As shown in the drawings, the disposition of the trunnions is toward the end of the lid nearer to the handle 3, and farther removed from the spout 2, the preponderance of the weight of the lid being so disposed toward the end which closes the spout 2, or discharge side of the receptacle 1. It is obvious, however, that such disposition is merely a matter of convenience, inasmuch as a distribution of the weight of the lid sufficient to effect its closure might be made independently of the disposition of the trunnions.

I prefer to provide within the interior of the open end of the receptacle a circumferential shoulder 7, against which the lid 4 rests when in the closed position, and with which the thickness of a lid coöperates to constitute a joint of such closeness as may effectually exclude from the closed receptacle the intrusion of dust, minute insects or the like. Between the pivotal connection which unites the lid 4 to the receptacle 1, and the handle 3, I provide a depressed portion 8 of the shoulder 7, whose angle of depression is such as to permit at that point the downward movement of the lid and to limit such movement. The shoulder 7, with its extension 8, performs therefore the function of a stop mechanism for the lid, and is representative of any stop mechanism which may be preferred.

The lid 4, when closed, is preferably flush with the upper edge of the receptacle 1, and is preferably provided upon its depressible end with a projection or button 9, by the aid of which the thumb of a hand grasping the handle 3 may be conveniently employed to depress the one end of the lid and open the other, after the manner shown in Fig. I.

In place of the projecting trunnions shown in the first three figures of the drawings, half round journals 10 located on the under side of the lid, as shown in Fig. IV, may be used, and bearings 11 therefor may be provided in the shoulder 7 substantially at the point of its angle with its depression 8. This construction has the advantage of elimination of the notches in the edge of the receptacle 1, and of the projection of the trunnions 5 outside of the edge of the lid, a projection which it might be desirable to eliminate if the lid be made of delicate, fragile, and particularly of expensive material.

In the first five figures of the drawings, the lid is shown as provided with the male members of the pivotal connection, and the receptacle is shown as provided with the female members thereof. In Fig. VI a reversal of such disposition is illustrated, in which the male pivotal members 12 are carried by the receptacle 1, and the female members 13 by the lid 4.

From the foregoing specification it will appear that my invention provides a perfectly sanitary device, one which may be kept perfectly clean and sightly, whatever be the material of which the receptacle and its lid be made, and which will operate entirely by gravity without the aid of springs or other devices, which besides being unsightly, are difficult, if not impossible, to be kept clean.

By reason of the fact that my invention, in its most sanitary form of embodiment, may be made throughout of fragile material, both its parts may be made to standard sizes, and each part becomes therefore an article of manufacture of individual utility.

What I claim is:

1. The combination with a receptacle provided near its open end with a circumferential shoulder, having a depressed portion to accommodate and limit the tilt of the lid, of a lid fitting when closed within said open end of the receptacle against said shoulder, and a pivotal connection between the receptacle and lid.

2. The combination with a receptacle provided within its open end with a circumferential shoulder having a depressed portion forming with it an angle of depression, of a lid fitting when closed within said open end of the receptacle against said shoulder and pivotally united, by a medially disposed connection, to said shoulder substantially at the said angle of depression, whereby the said depressed portion of the shoulder acts as a stop to the opening of the lid and the remainder of it to the closing thereof.

3. The combination with a receptacle provided with a shoulder adjacent the open end thereof, of a lid fitting within said receptacle and being seated upon said shoulder, pivot members upon said lid adapted to coöperate with said receptacle, said shoulder being provided with a depressed portion forming a stop to limit the opening movement of said lid, and a thumb piece secured to said lid and located relative to said pivot and said stop so that pressure on said thumb piece is sustained by said pivot and said stop.

4. The combination of a pitcher provided at its open upper end with a shoulder, a lid fitting within said open upper end of said pitcher and resting upon a portion of said shoulder, a separable pivotal connection between said lid and said receptacle, a handle upon said receptacle, said shoulder between said handle and said pivotal connection being inclined from said pivotal connection toward said handle to provide a stop to limit the opening movement of said lid, and a thumb piece mounted upon said lid to securely hold said lid against the inclined portion of said shoulder when pressure is applied to said thumb piece to open the lid.

5. As a new article of manufacture, a receptacle provided at its open upper end with a circumferential shoulder, a portion of said circumferential shoulder being substantially at right angles to the axis of said receptacle, another portion of said shoulder lying in a plane inclined to the first mentioned portion of said shoulder, and a pivotal member mounted on said receptacle adjacent the angles of depression of said shoulder, said pivotal member adapted to contact with the different portions of said shoulder when in open and closed positions.

6. In combination, a pitcher, a lid within the mouth of said pitcher, a pair of pivots attaching said lid to said pitcher, and means on said pitcher forming a closure between the depressed portion of said lid and said pitcher when said lid is rocked on said pivots in its opening movement.

7. A receptacle provided adjacent its open upper end with a circumferential shoulder, said shoulder having its upper surface disposed in intersecting planes, and a lid for said receptacle having a pivotal connection therewith substantially coincident with the intersection of said planes, and adapted to lie in one of said planes when in open position and in the other of said planes when in closed position.

8. The combination with a receptacle, and a lid provided with a pivotal connection with the receptacle and swung within the open end thereof, of closure forming means within the receptacle rearwardly of said pivotal connection, for limiting the pivotal opening movement of the lid.

In testimony whereof, I have hereunto set my hand in the presence of two subscribing witnesses.

CHARLES S. BARON.

Witnesses:
HARRY TAGGART,
MARIE R. O'BRIEN.

Copies of this patent may be obtained for five cents each, by addressing the "Commissioner of Patents, Washington, D. C."